(12) United States Patent
Navid et al.

(10) Patent No.: US 8,964,879 B2
(45) Date of Patent: Feb. 24, 2015

(54) CROSSTALK REDUCTION CODING SCHEMES

(71) Applicant: Rambus Inc., Sunnyvale, CA (US)

(72) Inventors: Reza Navid, San Francisco, CA (US);
Amir Amirkhany, Sunnyvale, CA (US);
Dinesh D. Patil, Sunnyvale, CA (US);
Brian S. Leibowitz, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/937,549

(22) Filed: Jul. 9, 2013

(65) Prior Publication Data
US 2014/0023161 A1 Jan. 23, 2014

Related U.S. Application Data

(60) Provisional application No. 61/672,932, filed on Jul. 18, 2012.

(51) Int. Cl.
*H04B 15/00* (2006.01)
*H04L 1/00* (2006.01)

(52) U.S. Cl.
CPC .......... *H04L 1/0083* (2013.01); *H04L 1/0001* (2013.01); *H04L 1/0002* (2013.01); *H04L 1/0007* (2013.01)
USPC ........... 375/285; 375/219; 375/259; 375/295; 375/316; 375/322

(58) Field of Classification Search
CPC .......... G11B 2020/10888; G11B 2020/1239; G11B 2020/1267; G11B 2020/1272; G11B 2020/1287; G11B 2020/1836; G11B 20/1217; G11B 20/18; G11B 20/1833; G11B 2220/215; G11B 2220/216; G11B 2220/2537
USPC ......... 375/211, 219, 229, 254, 259, 267, 271, 375/285, 286, 295, 299, 316, 322
See application file for complete search history.

(56) References Cited

U.S. PATENT DOCUMENTS

| | | | |
|---|---|---|---|
| 6,747,580 B1 | 6/2004 | Schmidt | |
| 7,283,460 B1 * | 10/2007 | Visalli et al. | 370/201 |
| 7,400,276 B1 * | 7/2008 | Sotiriadis et al. | 341/61 |
| 7,583,209 B1 * | 9/2009 | Duan | 341/80 |
| 8,848,810 B2 * | 9/2014 | Lee et al. | 375/260 |
| 2006/0132419 A1 * | 6/2006 | Morita | 345/98 |
| 2006/0139186 A1 * | 6/2006 | Hoyer | 341/50 |
| 2009/0267813 A1 * | 10/2009 | Bae et al. | 341/95 |

(Continued)

OTHER PUBLICATIONS

Chang et al., "A Bit-Stuffing Algorithm for Crosstalk Avoidance in High Speed Switching," Institute of Communications Engineering, National Tsing Hua University, 2010. 9 pages.

*Primary Examiner* — Hirdepal Singh
(74) *Attorney, Agent, or Firm* — Fenwick & West LLP

(57) ABSTRACT

Data coding schemes perform level-based and/or transition-based encoding to avoid signaling conditions that create worst case crosstalk during transmission of multi-bit data from one circuit to another circuit via a parallel communication link. The coding schemes disallow certain patterns from being present in the signal levels, signal transitions, or a combination of the signal levels and signal transitions that occur in a subset of the multi-bit data that corresponds to certain physically neighboring wires of the parallel communication link.

9 Claims, 14 Drawing Sheets

(56) References Cited

U.S. PATENT DOCUMENTS

| | | | |
|---|---|---|---|
| 2010/0214138 A1* | 8/2010 | Hollis | 341/55 |
| 2011/0128170 A1* | 6/2011 | Bae et al. | 341/95 |
| 2011/0156934 A1 | 6/2011 | Bae et al. | |
| 2011/0310992 A1* | 12/2011 | Franzon et al. | 375/286 |
| 2013/0300498 A1* | 11/2013 | Won et al. | 330/124 R |

* cited by examiner

| m-bit data | pattern present in encoded data | n-bit data |
|---|---|---|
| 000 | Allowed | 0000 |
| 001 | Allowed | 0001 |
| 010 | Disallowed | 0110 |
| 011 | Allowed | 0011 |
| 100 | Allowed | 1100 |
| 101 | Allowed | 1000 |
| 110 | Allowed | 1110 |
| 111 | Allowed | 1111 |

| m-bit data | Pattern present in encoded data | n-bit data |
|---|---|---|
| 000 | Allowed | 0000 |
| 001 | Allowed | 0001 |
| 010 | Allowed | 0010 |
| 011 | Allowed | 0011 |
| 100 | Allowed | 0100 |
| 101 | Allowed | 0101 |
| 110 | Allowed | 0110 |
| 111 | Disallowed | 1000 |

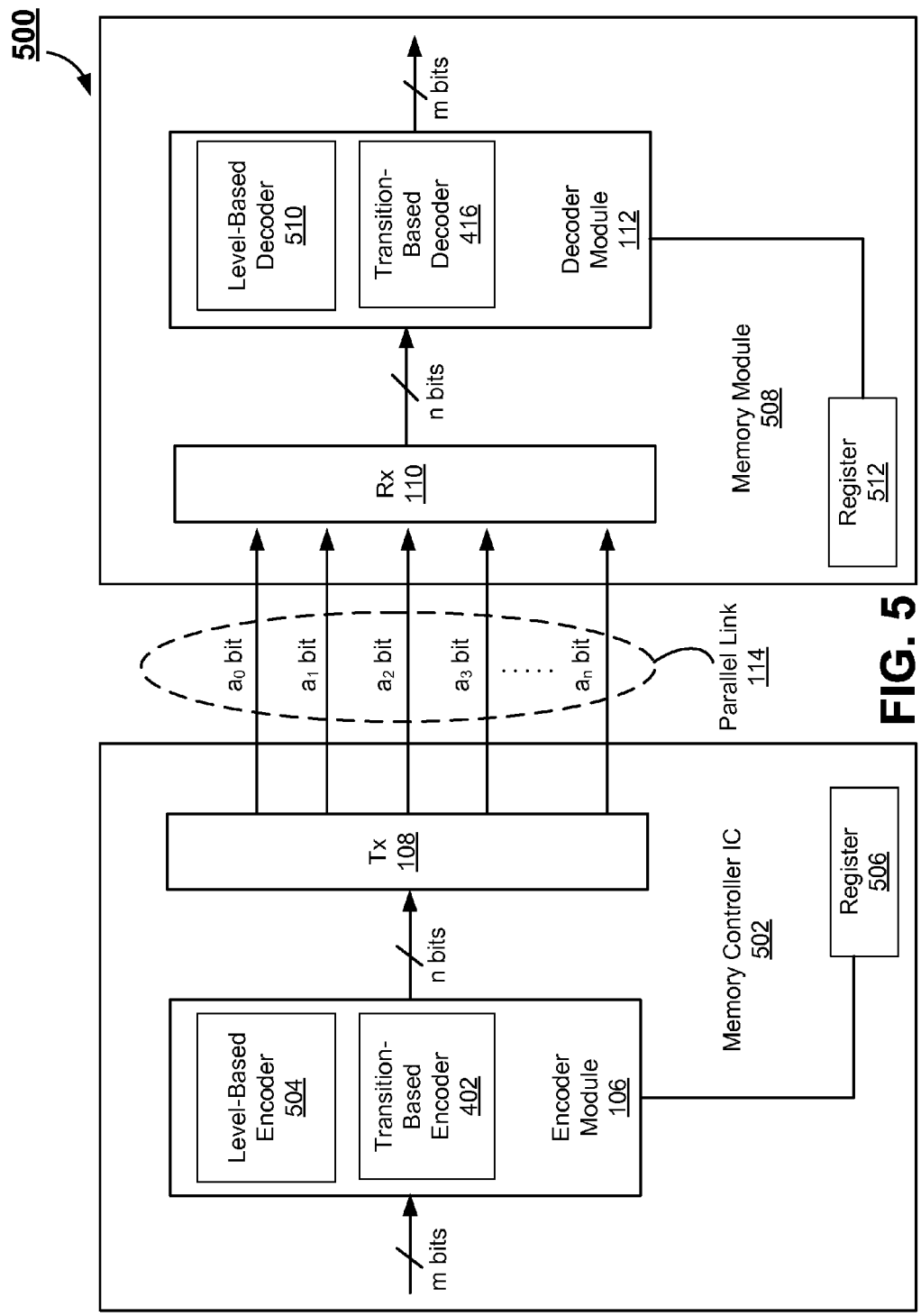

CROSSTALK REDUCTION CODING SCHEMES

BACKGROUND

The present disclosure relates to encoding data for transfer on a chip-to-chip communication link.

Integrated circuit (IC) devices communicate with one another using input/output (I/O) circuits that are configured to transmit and receive multi-bit data over a parallel communication link. In many highly-integrated and/or small form factor IC devices, the parallel communication link may use single-ended signaling to route an increasing number of signals in a limited available routing area. And, as IC chips are increasingly used to generate and access multimedia data, single-ended parallel communication links provide an area efficient solution for the increased I/O density and constrained wire spacing.

But the constrained wire spacing and increased I/O density creates signal integrity challenges due to crosstalk from adjacent wires in densely routed systems. Specifically, when one aggressor single-ended signal line within the communication link changes state, it creates an electromagnetic interference along the signal path of that circuit. This interference may then be coupled to the other victim signal lines within the communication link within proximity of the one signal line. The need for more area efficient routing, faster edge rates to meet higher bandwidths requirements, and wider buses to meet increased capacity demands further exacerbate crosstalk interference for single-ended parallel communication links.

BRIEF DESCRIPTION OF THE DRAWINGS

FIG. 2C illustrates a signal level-based coding scheme for transmitting three-bits of information on a four-bit wide interface, according to the first embodiment.

FIG. 3C illustrates a transition-based coding scheme for transmitting three-bits of information on four-bit wide interface, according to the second embodiment.

FIG. 5 illustrates another system including an encoder and a decoder configured to perform level-based, transition-based, and/or a combination of level-based and transition-based encoding and decoding, according to a fourth embodiment.

DETAILED DESCRIPTION OF EMBODIMENTS

Figure 1:
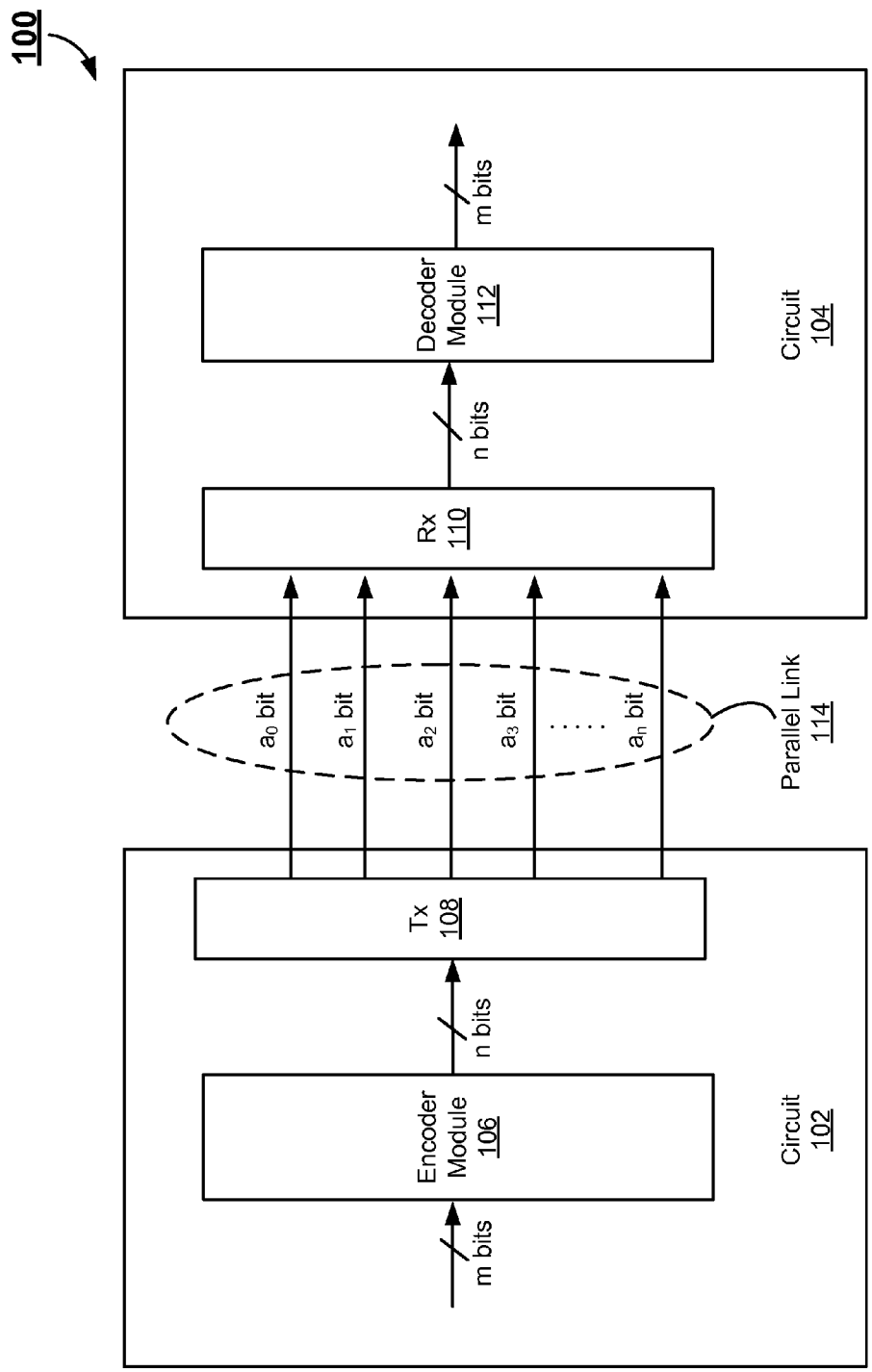
FIG. 1 illustrates a system including an encoder and a decoder using signal level-based or signal transition-based encoding and decoding, according to an embodiment.

Embodiments of the present disclosure include a system for encoding a first set of multi-bit data to a second set of multi-bit data having a larger number of bits than the first set, where no set of a predetermined number of bits of the second set of multi-bit data corresponding to three physically neighboring wires over at least a portion of a parallel communication link has a prohibited pattern.

In the disclosed embodiments, a plurality of coding schemes are applied to ensure that transmitted signals do not contain certain prohibited patterns of signal levels (e.g., "101" or "101"), transitions between signal levels (e.g., "101" to "010"), or both on any subset of three physically neighboring wires on a parallel communication link. Specifically, the disclosed coding schemes use an expanded signaling space to map input bit patterns to a code space that does not rely on the prohibited patterns, and thus helps avoid worst-case crosstalk.

For example, in the first embodiment, a level-based encoding scheme is used to map input symbols to a code space without any disallowed levels on three neighboring bits. In operation, the level-based encoding scheme encodes m-bit data to generate n-bit signaling data; In the n-bit space, any code that would present predefined first, second, and first levels appearing on three physically neighboring signal lines (e.g., for all, a majority, or a portion of the signaling path) is an invalid code, and is disallowed. In the level-based encoding scheme, m is an integer value not less than three, and n is an integer value not less than four, and greater than m.

For another example, in the second embodiment, a transition-based encoding scheme is used to map input symbols to a code space without any disallowed transitions on three neighboring bits in two consecutive symbol intervals. In operation, the transition-based encoding scheme encodes a first set of m-bit data received at a first time to generate a first set of n-bit data where m is an integer value not less than three, and n is an integer value not less than four, and greater than m. The transition-based coding scheme further encodes a second set of m-bit data received at a second time to generate a second set of n-bit data, where the encoding of the first and second sets of m-bit data is conducted to disallow three bits in the first set of n-bit data corresponding to three physically neighboring wires over at least a portion of the parallel communication link from all transitioning in the second set of n-bit data.

Reference will now be made to several embodiments of the present disclosure, examples of which are illustrated in the accompanying figures. It is noted that wherever practicable, similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

FIG. 1 illustrates system 100 for performing level-based and transition-based encoding and decoding, according to the embodiments described herein. System 100 includes two circuits 102 and 104 configured to communicate with each other using parallel communication link 114. In one implementation of the embodiments of FIG. 1, circuit 102 is a memory controller, and circuit 104 is a memory device such as a DRAM or SRAM, or vice versa. In another implementation of the embodiments of FIG. 1, circuits 102 and 104 are other types of circuits communicating data between each other.

Parallel communication link 114 is a bus or part of a bus on a printed circuit board (PCB), flexible substrate, die, or other substrate on which the circuits 102 and 104 reside. Parallel communication link 114 includes an n-bit wide group of n parallel transmission lines (or pairs of transmission lines) for transmitting a sequence of n-bit binary data ($a_0\ a_1\ a_2\ a_3\ \ldots a_n$) from circuit 102 to circuit 104, and/or vice versa.

Circuit 102 includes encoder module 106 and transmitter (Tx) 108. Unencoded m-bit data is provided to encoder module 106 as serial or parallel data, and encoder module 106 encodes the m-bit data and generates n-bit data encoded according to the embodiments herein. Circuit 104 includes decoder module 112 and receiver (Rx) 110. Encoded n-bit data is provided to decoder module 112 as serial or parallel data, and decoder module 112 decodes the n-bit data and generates the m-bit unencoded data. In a further implementation of the embodiments of FIG. 1, circuit 104 also includes another encoder module (not shown) and a transmitter (not shown) for transmitting encoded data to circuit 102, and circuit 102 includes a receiver (not shown) and a decoder module (not shown) for receiving and decoding the encoded data received from circuit 104.

In the first embodiment of FIG. 1, system 100 performs a level-based encoding and decoding scheme to avoid scenarios that may lead to worst case crosstalk occurring on a set of three physically neighboring wires over at least a portion of parallel communication link 114. Crosstalk can result when the energy produced by a switching event occurring in one conductor (i.e., an aggressor line) or transmission line is coupled to a physically neighboring conductor (i.e., a victim line). In cases where there are three physically neighboring lines, a worst case crosstalk scenario may occur on a victim line in between two aggressor lines when a switching event occurs on both aggressor lines. For example, a worst case crosstalk scenario may occur when signal levels on three physically neighboring lines transitions from "101" to "010" or vice versa, where the ordering of the signal levels in the signal level pattern corresponds to the physical ordering of the three physically neighboring lines of parallel link 114 (e.g., lines physically ordered from left to right have respective signal level values of 1-0-1 at a first time and have respective signal level values of 0-1-0 at a second time immediately subsequent to the first time) regardless of the logical ordering (serial or parallel) of the m-bit data, and signal level value "1" indicates a logic high and signal level value "0" indicates a logic low.

In a first implementation of the first embodiment of FIG. 1, system 100 avoids a scenario where the signal levels on three physically neighboring lines transition from "101" to "010" or vice versa, by disallowing the signal level patterns of both "101" and "010" from occurring on three physically neighboring lines over at least a portion of parallel communication link 114. By disallowing signal level patterns both "101" and "010" on three physically neighboring lines, a transition from prohibited signal level patterns "101" to "010" and vice versa would never occur because such signal level patterns do not exist in the encoded data, and thus a worst case crosstalk scenario can be avoided.

Specifically, in the first implementation of a first embodiment of FIG. 1, system 100 includes encoder module 106 configured to encode m-bit data to generate n-bit encoded data in a manner to disallow prohibited signal level patterns "101" and "010" on any three physically neighboring wires over at least a portion of parallel communication link 114. In the level-based encoding scheme, m is an integer value not less than three, and n is an integer value not less than four, and greater than m. The prohibited patterns of signal levels in the n-bit encoded data are ones that could create significant crosstalk if followed by a worst-case pattern when transmitted on parallel communication link 114.

In a second implementation of the first embodiment of FIG. 1, encoder module 106 is configured to use a more efficient encoding scheme compared to the encoding scheme used in the first implementation of the first embodiment of FIG. 1 as explained above. Specifically, in the second implementation of the first embodiment of FIG. 1, encoder module 106 is configured to encode m-bit data to generate n-bit encoded data in a manner to disallow either one of the prohibited signal level patterns "101" or "010", but not prohibit both, on any three physically neighboring wires over at least a portion of parallel communication link 114. For example, by disallowing signal level pattern "101" on three physically neighboring lines, a transition from "101" to "010" or from "010" to "101" would not occur because the signal level pattern "101" does not exist in the encoded signal level pattern. Consequently, a worst case crosstalk scenario can still be avoided. Similarly, by disallowing signal level pattern "010" on three physically neighboring lines, a transition from "010" to "101" or "101" to "010" does not occur because the signal level pattern "010" does not exist in the encoded signal level pattern. Consequently, another worst case crosstalk scenario can be avoided. By disallowing only one of the two prohibited patterns in the second implementation of the first embodiment of FIG. 1, encoder 106 uses fewer coding resources as compared to the coding resources used by encoder 106 in the first implementation of the first embodiment of FIG. 1.

In the second embodiment of FIG. 1, system 100 performs a transition-based encoding and decoding scheme to avoid scenarios that may lead to worst case crosstalk occurring on a set of three physically neighboring wires over at least a portion of parallel communication link 114 by disallowing prohibited signal level transitions on the three physically neighboring lines. When transporting multi-bit data over parallel communication link 114, worst case crosstalk may also occur when data transmitted on three physically neighboring lines transitioning from zero to one or from one to zero (i.e., data on all three neighboring lines transitioning, but not necessarily in the same manner).

Thus, in the second embodiment of FIG. 1, encoder module 106 is configured to encode m-bit data to generate n-bit encoded data in a manner to disallow transitions in three physically neighboring signal lines that can cause worst case crosstalk scenarios. For example, the transition-based encoding method may encode three-bit patterns to generate four-bit patterns that disallow transitions on any three neighboring bits that would create a worst case crosstalk scenario. A transition in the corresponding bit between data sampled in two consecutive symbol intervals may be represented as a logic high ("1") and a non-transition may be represented as a logic low ("0") or vice versa. Accordingly, encoder 106 in the transition-based coding scheme operates to avoid a "111"

pattern representing data on three neighboring bits transitioning between the two consecutive symbol intervals.

Returning to the embodiments disclosed in FIG. 1, encoder module 106 receives a first set of m-bit data from other circuits (not shown) or other circuit components (e.g., state machines, not shown) within circuit 102. As will be explained in more detail below with references to FIGS. 2A, 2C, 3A, and 3C, encoder module 106 includes combinatorial logic or look-up tables to encode m-bit data to n-bit data, using the one or a combination of the level-based encoding schemes as described with respect to the first embodiment of system 100 of FIG. 1 and transition-based encoding schemes as described with respect to the second embodiment of system 100 of FIG. 1.

Transmitter 108 transmits the n-bit encoded data received from encoder module 106 over parallel binary communication link 114 to receiver 110 of circuit 104. Receiver 110 provides the received n-bit data to decoder module 112. Decoder module 112 decodes the n-bit data to m-bit data. Decoder module 112 includes combinatorial logic or look-up tables that are configured to operate to decode the received n-bit data to m-bit data, using one or a combination of the level-based and transition-based decoding methods of the first and second embodiments described herein.

Figure 2A:
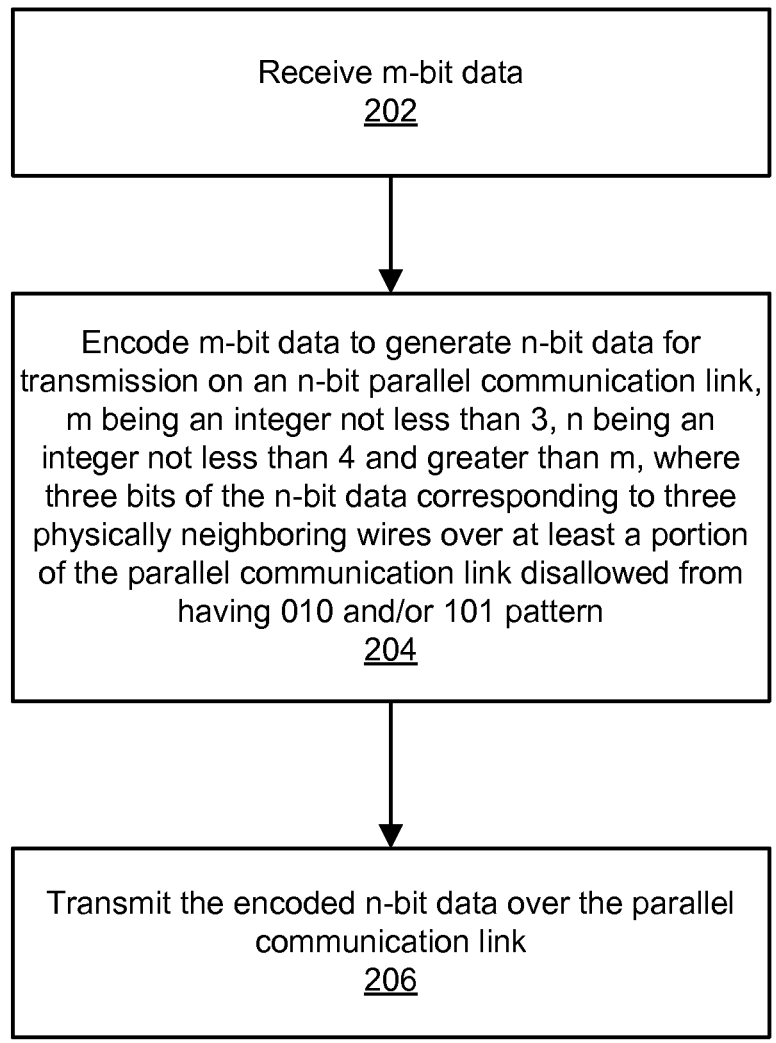
FIG. 2A illustrates a method of signal level-based encoding, according to a first embodiment.

FIG. 2A illustrates an exemplary method of level-based encoding, according to the first embodiment. In the level-based encoding scheme of the first embodiment, multi-bit data is encoded to disallow certain signal level patterns, such as "010" or "101" patterns in the encoded data corresponding to three physically neighboring lines over a portion of a parallel communication link 114 that can cause worst case crosstalk scenarios.

In the method described in FIG. 2A, encoder module 106 receives 202 m-bit data. The m-bit data is encoded 204 to generate n-bit data for transmission on n-bit parallel communication link 114. An example level-based encoding scheme in accordance with the method described in FIG. 2A uses a predetermined mapping to map the m-bit data to n-bit data, with certain data patterns corresponding to three neighboring wires of the parallel communication link being disallowed in the n-bit data. In this level-based encoding, m represents an integer not less than three, and n represent an integer not less than four and greater than m.

As previously discussed, in the first implementation of the level-based encoding scheme according to the first embodiment, the level-based encoding scheme disallows both prohibited signal level patterns "101" and "010" in the n-bit data on any three physically neighboring wires over at least a portion of parallel communication link 114. In this case, three-bit data corresponding to three physically neighboring lines at a particular time or unit interval, may be coded as four-bit data to avoid signal level patterns "010" and "101" from being transmitted 206 on three physically neighboring lines over at least a portion of parallel communication link 114.

On the other hand, in the second implementation of the level-based encoding scheme according to the first embodiment, the level-based encoding scheme disallows one of the two signal level patterns "101" or "010" in the n-bit data, but not both. In which case, three-bit data corresponding to three physically neighboring lines at a particular time or unit interval, may be coded as four-bit data to avoid a "010" or "101" pattern from being transmitted 206 on three physically neighboring lines over at least a portion of parallel communication link 114. The mapping of m-bit data to n-bit data may be performed using any valid mapping scheme as further described with reference to FIG. 2C.

Figure 2B:
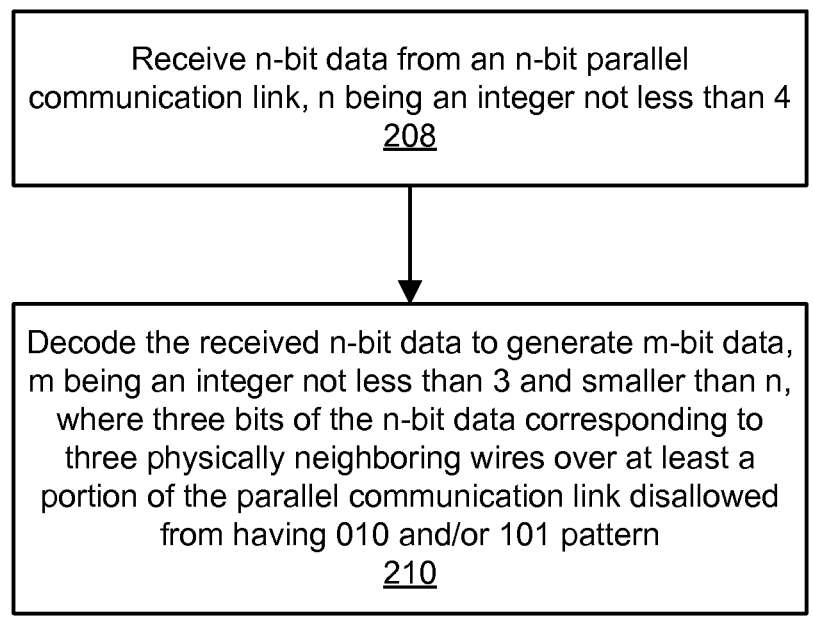
FIG. 2B illustrates a method of signal level-based decoding, according to the first embodiment.

FIG. 2B illustrates an exemplary method of level-based decoding according to the first embodiment. The method described in FIG. 2B operates to decode the n-bit data encoded according to the method of FIG. 2A to recover the unencoded m-bit data. As explained above, the n-bit encoded data does not include the disallowed data patterns according to the encoding scheme described above with reference to FIG. 2A, but the decoded m-bit data fully recovers the original m-bit unencoded data received by the encoder module 106. Specifically, in the method described in FIG. 2B, n-bit data transmitted over parallel communication link 114 is received 208. The n-bit data is decoded 210 to recover the m-bit data originally received by encoder module 106. To decode the n-bit data to recover the m-bit data, decoder module 112 uses digital logic or one or more look-up tables that maps the encoded n-bit data to the m-bit data in a manner reverse to the encoding performed according to the embodiment of FIG. 2A.

FIG. 2C illustrates a table 212 of an exemplary level-based coding scheme for transmitting three-bits of information on four-bit wide interface described in FIGS. 2A and 2B. While the example of FIG. 2C shows a level-based encoding scheme mapping three-bit unencoded data to four-bit encoded data, the number of bits used in the table of FIG. 2C is merely exemplary and the same principles may be applied to mapping any number of m-bit unencoded data to n-bit encoded data where m is an integer not less than three, n is an integer not less than four, and n is greater than m. The level-based encoding scheme shown in FIG. 2C maps three-bit patterns to four-bit patterns, with certain data patterns corresponding to three neighboring wires of the parallel communication link being disallowed in the 4-bit data. For example, as shown in the m-bit data column of Table 212, three-bit data includes eight three-bit patterns. The example level-based encoding scheme shown in Table 212 represent the second implementation of the level-based encoding scheme of the first embodiment where only "010" is prohibited in the encoded n-bit data. As shown in Table 212, seven signal level patterns are allowed patterns, and one signal level pattern "010" is disallowed from being present in the encoded n-bit data because the prohibited pattern being present on three physically neighboring lines of a portion of communication link 114 could lead to a worst case crosstalk scenario. Although not explicitly shown in Table 212, in the first implementation of the level-based encoding scheme of the first embodiment, six signal level patterns would be allowed because both of the two signal level patterns "010" and "101" are disallowed from being present in the n-bit encoded data pattern, as previously discussed with respect to this first implementation of the first embodiment.

The n-bit data column of Table 212 lists a valid mapping for each three-bit data pattern to a four-bit data pattern. Note that the n-bit data column does not contain any data pattern where encoded n-bit data corresponding to three physically neighboring bits have the disallowed signal level patterns (e.g., "010" and "101" in the first implementation of the first embodiment, or either "010" or "101" in the second implementation of the first embodiment), thereby avoiding a worst case crosstalk scenario from occurring when the n-bit encoded data is transmitted over at least a portion of n-bit parallel communication link 114. According to the level-based encoding scheme of the first embodiment, any mapping from the m-bit data to the n-bit data is a valid level-based encoding scheme, if:

$$\text{Expanded space} - \text{Disallowed space} \geq \text{Information space}, \quad (1)$$

where the expanded space is the number of n-bit data patterns available (i.e., $2^n$), the disallowed space is the number of n-bit data patterns that are disallowed because they contain the worst case data pattern "010" and/or "101," and the information space is the number of m-bit data patterns to be encoded. That is, the number of allowed n-bit data patterns must exceed the number of m-bit data patterns to encode in order to for the mapping scheme to be valid. For example, in the second implementation of the level-based encoding scheme (the first embodiment), where either "010" or "101" signal level patterns is disallowed, for a three-bit to four-bit level-based encoding scheme, the expanded space (four-bit interface width) includes sixteen four-bit patterns, the disallowed space includes four four-bit patterns that include either a "010" or "101" signal level pattern (e.g., "0010", "0100", "0101", and "1010" if "010" is disallowed or, "1011", "1010", "0101", and "1101" if "101" is disallowed), and the three-bit information space includes eight three-bit combinations ($2^3$). Thus, the eight three-bit signal level patterns can be mapped to the eight of the twelve allowed four-bit signal level patterns in the expanded space. Any one of the twelve allowed four-bit signal level patterns may be used to encode one of the eight three-bit signal level patterns. In the exemplary mapping of Table 212, the allowed three-bit patterns $a_2\ a_1\ a_0$ are mapped to four-bit patterns of $a_2\ a_2\ a_1\ a_0$. The disallowed three-bit signal level pattern ("010" or "101") can be mapped to any one of the remaining five of the twelve allowed four-bit patterns. Similarly, the mapping described in Table 212 may be modified to any valid mapping scheme suitable to map each allowed and disallowed three-bit pattern to a unique four-bit patterns from the twelve allowed four-bit patterns. The mapping shown in Table 212 may be stored in one or more look-up tables in a register accessible by encoder module 106 to encode the three-bit data. In another embodiment, the mapping shown in Table 212 may be implemented in digital logic.

Table 1 below illustrates how the second implementation of the level-based encoding scheme according to the first embodiment described herein may be expanded to other number of bits of data to encode and how to select the optimum number of bits for efficient encoding. Specifically, Table 1 shows, for each interface width (A) (i.e., number of bits) for the encoded data, the number (B) of disallowed (containing "010" if "010" is chosen as the prohibited data pattern or containing "101" if "101" is chosen as the prohibited data pattern) data patterns and the number (C) of allowed data patterns among the total available bit combinations (D) and the fraction (E) of the allowed data patterns in the information space, i.e., E=C/D.

TABLE 1

(Information space)

| A Interface width (for encoded data) | B Number of Disallowed Data Patterns | C Number of Allowed Data Patterns | D Total bit combinations available with the interface width | E Fraction of allowed data patterns in the information space |
|---|---|---|---|---|
| 3 bits | 1 | 7 | 8 | 0.875 |
| 4 bits | 4 | 12 | 16 | 0.75 |
| 5 bits | 11 | 21 | 32 | 0.656 |
| 6 bits | 27 | 37 | 64 | 0.578 |

TABLE 1-continued (Information space)

| A Interface width (for encoded data) | B Number of Disallowed Data Patterns | C Number of Allowed Data Patterns | D Total bit combinations available with the interface width | E Fraction of allowed data patterns in the information space |
|---|---|---|---|---|
| 7 bits | 63 | 65 | 128 | 0.508 |
| 8 bits | 142 | 114 | 256 | 0.445 < 0.5 |

As shown in Table 1, as the interface width increases, the total number (B) of disallowed patterns becomes a larger fraction of the total combinations (D) and the total number (C) of allowed patterns becomes a smaller fraction (E) of the total combinations (D). The level-based coding scheme according to the first embodiment may use an interface width to maximize the efficiency of signal lines used to transmit encoded data. For the mapping to be feasible, the total number of allowed state in an n-bit wide space should be larger than half the space, or equivalently, E>=0.5 for A=n. In Table 1 above, a coding scheme using 6 bits in the information space (m=6, n=7) would be the most efficient for the level-based coding scheme for the second implementation of the first embodiment.

Table 2 below describes one example of a mapping of four-bit unencoded data to five-bit encoded data according to the second implementation of the level-based encoding of the first embodiment where "101" is chosen as the disallowed data pattern. Referring to Table 1, a five-bit wide data interface has twenty-one allowed patterns (i.e., patterns that do not include a "101" signal level pattern, if "010" is an allowed pattern, or patterns that do not include a "010" signal level pattern, if "101" is an allowed pattern), and eleven disallowed patterns (i.e., patterns that includes a signal level pattern that are avoided in the encoded n-bit data because the presence of the disallowed signal level pattern in the encoded n-bit data on three physically neighboring bits over at least a portion of communication link 114 might lead to a worst case crosstalk scenario). Thus, for four-bit unencoded data having sixteen total bit combinations, each of the sixteen bit combinations may be mapped to one of the sixteen allowed five-bit patterns of a five-bit wide interface.

TABLE 2

(Level-based coding mapping scheme, which assumes "101" is a disallowed pattern and "010" is an allowed pattern)

| m-bit data | Pattern | n-bit data |
|---|---|---|
| 0000 | Allowed | 00000 |
| 0001 | Allowed | 00001 |
| 0010 | Allowed | 01110 |
| 0011 | Allowed | 00011 |
| 0100 | Allowed | 01100 |
| 0101 | Disallowed | 01111 |
| 0110 | Allowed | 00110 |
| 0111 | Allowed | 00111 |
| 1000 | Allowed | 11000 |
| 1001 | Allowed | 11001 |
| 1010 | Disallowed | 10000 |
| 1011 | Disallowed | 10011 |
| 1100 | Allowed | 11100 |
| 1101 | Disallowed | 10001 |

TABLE 2-continued (Level-based coding mapping scheme, which assumes
"101" is a disallowed pattern and "010" is an allowed pattern)

| m-bit data | Pattern | n-bit data |
|---|---|---|
| 1110 | Allowed | 11110 |
| 1111 | Allowed | 11111 |

Figure 3A:
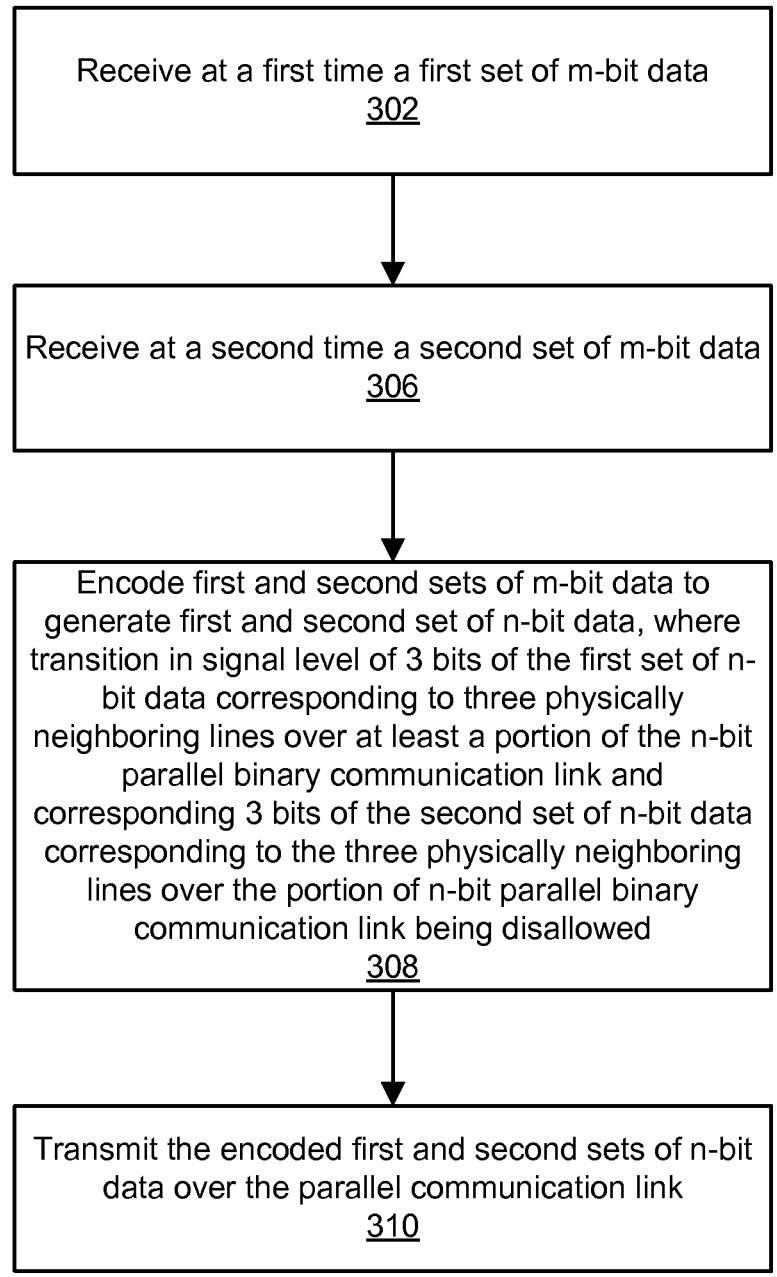
FIG. 3A illustrates a method of transition-based encoding, according to a second embodiment.

FIG. 3A illustrates an exemplary method of transition-based encoding according to a second embodiment. In an embodiment, multi-bit data is encoded to disallow transitions in three physically neighboring signal lines that can cause worst case crosstalk scenarios. For example, the transition-based encoding method may encode three-bit patterns to generate four-bit patterns that disallow transitions on any three physically neighboring signal lines that would create a worst case crosstalk scenario. In the worst case crosstalk scenario, three neighboring signal lines transition at the same time. For example, a worst crosstalk scenario may occur on n-bit parallel communication link 114 when the signal level pattern on three bits corresponding to three physically neighboring lines of n-bit parallel communication link 114 transition between two consecutive symbol intervals from "000" to "111", from "001" to "110", from "010" to "101", from "011" to "100", from "110" to "001", or from "111" to "000." The above signal level pattern transitions are examples of a set of three physically neighboring lines of n-bit parallel communication link 114 transitioning at the same time between two consecutive symbol intervals. A transition in the corresponding bit between data sampled in two consecutive timings may be represented as a logic high ("1") and a non-transition may be represented as a logic low ("0") or vice versa. Accordingly, the transition-based coding scheme operates to avoid a "111" pattern on three physically neighboring lines of parallel communication link 114. Furthermore, using a transition-based coding scheme provides improved pin-efficiency compared to a level-based coding scheme, by monitoring data transitions instead of data levels.

In the method described in FIG. 3A, a first set of m-bit data is received 302 at a first time (symbol interval) and a second set of m-bit data is also received 306 at a second time (symbol interval) occurring immediately after the first time (symbol interval). The received first and second sets of m-bit data may be a multi-bit signal represented as logic levels. Then, the first and second sets of received m-bit data is encoded 308 to generate corresponding first and second sets of n-bit data, respectively, for transmission on n-bit parallel communication link 114, where a transition in the data levels between any set of three neighboring bits of the first set of n-bit data corresponding to three physically neighboring lines over at least a portion of the n-bit parallel communication link 114 and the corresponding three neighboring bits of the second set of n-bit data corresponding to the three physically neighboring lines over at least a portion of the n-bit parallel communication link 114 is disallowed, according to the transition-based encoding of the second embodiment herein. The encoding 304 maps m-bit patterns to n-bit patterns in accordance with a predetermined mapping scheme accessible by encoder module 106 that prevents transitions in a set of three physically neighboring bits (a data pattern of "111" representing transition in the three physically neighboring bits between the first and second symbol intervals). As will be further described with reference to FIG. 3C, any valid mapping scheme may be used by encoder module 106 to perform transition-based encoding. In one example circuit for the third embodiment (transition based coding), the received m-bit data is converted from signal level data to transition data prior to encoding, as will be described below with reference to FIG. 4A. In another example circuit for the third embodiment (transition based coding), the received m-bit data themselves may be treated as transition data, rather than signal levels, and encoded without applying a level-to-transition conversion of the m-bit data for encoding, as will be described below with reference to FIG. 4C. The resulting first and second sets of n-bit encoded data are transmitted 310 over parallel communication link 114.

Figure 3B:
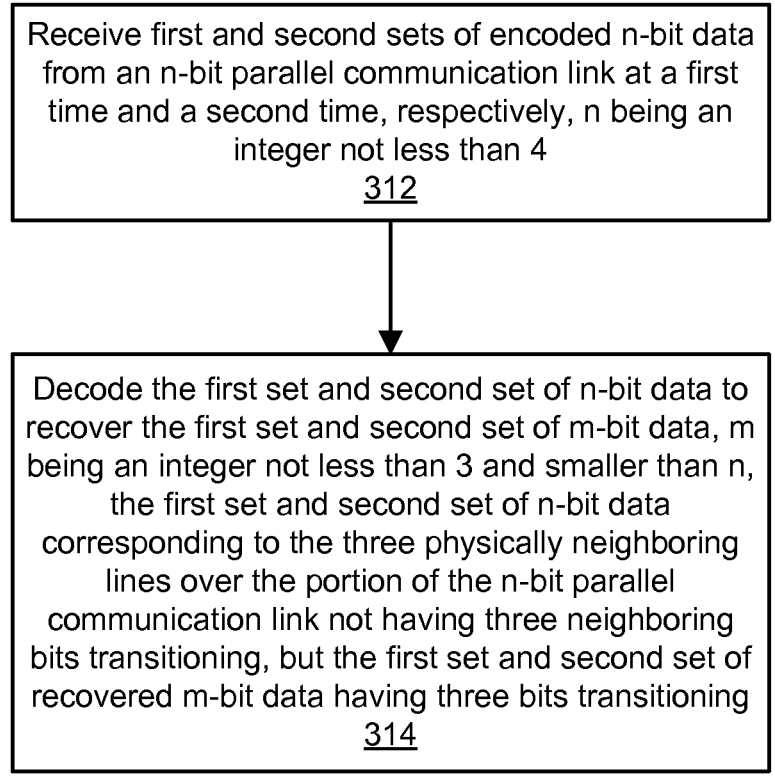
FIG. 3B illustrates a method of transition-based decoding, according to the second embodiment.

FIG. 3B illustrates an exemplary method of transition-based decoding according to the second embodiment herein. The decoding method described in FIG. 3B operates to do reverse mapping of the encoded n-bit code to the original m-bit code to recover the original m-bit code. Specifically, the first and second sets of encoded n-bit data transmitted over parallel communication link 114 are received 312 at first and second times, respectively. As in the encoding method of FIG. 3A, n is an integer not less than 4. Then, the first and second sets of n-bit data are decoded 314 to recover the first and second set of m-bit data, respectively, originally received by encoder module 106. The decoding is done by performing reverse mapping of the m-bit to n-bit encoding performed in FIG. 3A, for example by using a look-up table or digital logic that implements such reverse mapping of the n-bit code to m-bit code. Because the first and second sets of n-bit data were encoded according to the encoding method of FIG. 3A, the first and second sets of n-bit data do not include a set of three physically neighboring bits that transition levels between the first and second sets of n-bit data.

FIG. 3C illustrates a Table 318 describing the transition-based coding scheme for transmitting three bits of information on a four-bit wide interface according to the second embodiment described in FIGS. 3A and 3B. The transition-based encoding scheme maps three-bit patterns to four-bit patterns. In Table 318 of FIG. 3C, each bit represents whether a transition occurred or not, "1" representing the signal level transitioning from 0 to 1 or from 1 to 0 on that signal line between two consecutive symbol intervals, and "0" representing the signal level not transitioning between two consecutive symbol intervals (i.e., the signal level remaining at 1 or 0). Thus, in this second embodiment, it is desired to prevent simultaneous transitions in three physically adjacent signal lines of the output, i.e., any pattern of "111" in three physically adjacent signal lines. For example, as shown in the m-bit data column of Table 318, three-bit data includes eight three-bit patterns, where seven patterns are allowed patterns, and one pattern is disallowed (i.e., includes a "111" data pattern where all three bits corresponding to three physically neighboring lines transition signal levels, not necessarily all in the same manner). The n-bit data column of Table 318 lists a valid mapping for each three-bit allowed pattern to a four-bit allowed pattern and a valid mapping for each three-bit disallowed pattern to a four-bit allowed pattern. As previously described, a valid mapping exists if:

$$\text{Expanded space} - \text{Disallowed space} \geq \text{Information space}, \quad (1)$$

where the expanded space is the number of n-bit data patterns available (i.e., $2^n$), the disallowed space is the number of n-bit data patterns that are disallowed because they contain the worst case data pattern "111", and the information space is the number of m-bit data patterns to be encoded (i.e., $2^m$). That is, the number of allowed n-bit data patterns must exceed the number of m-bit data patterns to encode for the mapping scheme to be valid.

In the exemplary transition-based encoding scheme of FIG. 3C, allowed three-bit data $a_2 a_1 a_0$ is mapped to n-bit data $0 a_2 a_1 a_0$, and the disallowed m-bit pattern is mapped to one of the remaining ones of the allowed n-bit patterns. For example, as shown in Table 318, three-bit allowed pattern "010" is mapped to four-bit allowed pattern "0010", allowed three-bit pattern "110" is mapped to allowed four-bit data pattern "0110", and disallowed three-bit data pattern "111" is mapped to allowed four-bit data pattern "1000".

Table 3 below illustrates the transition-based encoding mapping scheme according to the second embodiment for a variety of interface widths. Specifically, Table 3 shows, for each interface width (A) (i.e., number of bits) for the encoded, the number (B) of disallowed (containing a "111" pattern) data patterns, and the number (C) of allowed data patterns among the total available bit combinations (D), and the fraction (E) of the allowed data patterns in the information space, i.e., E=C/D. As shown in Table 3, a four-bit wide data interface has thirteen allowed patterns (i.e., patterns that do not include a "111"), and three disallowed patterns. Thus, for three-bit unencoded transition data, eight valid four-bit patterns may be mapped to eight of the thirteen allowed four-bit patterns of a four-bit wide interface, with five valid four-bit patterns remaining unmapped in the expanded space.

TABLE 3

(Transition-based coding mapping scheme)

| A<br>Interface width for encoded data | B<br>Number of disallowed data patterns | C<br>Number of allowed data patterns | D<br>Total bit combinations available with the interface width | E<br>Fraction of allowed data patterns in the information space |
|---|---|---|---|---|
| 4 | 3 | 13 | 16 | 0.8125 |
| 5 | 8 | 24 | 32 | 0.75 |
| 6 | 20 | 44 | 64 | 0.6875 |
| 7 | 47 | 81 | 128 | 0.6328 |
| 8 | 107 | 149 | 256 | 0.5820 |
| 9 | 238 | 274 | 512 | 0.5352 |
| 10 | 520 | 504 | 1024 | 0.4922 < 0.5 |

Table 3 further suggests that a nine-bit interface width is an efficient interface width for the transition-based encoding scheme. For example, eight bits (256 combinations) can be efficiently transmitted over a nine-bit width interface. Any mapping of the 256 eight-bit combinations to the 274 allowed nine-bit combinations is valid, with eighteen extra nine-bit combinations available. The extra eighteen nine-bit combinations may be mapped to allowed eight-bit patterns (e.g., allowed eight bit patterns with a "11" on any two neighboring bits) to further minimize the number of transitions in the coded data or they instead could be used for system messages.

Accordingly, the mapping described in Table 318 of FIG. 3C may be modified to any valid mapping scheme suitable to map each allowed and disallowed three-bit pattern to a unique four-bit pattern from the thirteen allowed four-bit patterns. The mapping may be stored in one or more look-up tables or a register accessible by encoder module 106 for use in encoding.

In a third embodiment, an alternative transition-based coding scheme is configured to minimize complexity and eliminate the possibility that three bits corresponding to three physically adjacent wires transition within the same unit-interval. To minimize coding complexity, the transition-based coding scheme of the third embodiment includes an overhead bit to indicate whether data is coded. When the overhead bit is asserted, the eight-bit data is encoded to a new eight-bit pattern. On the other hand, when the overhead bit is not asserted, the eight-bit data passes through unencoded. To further simplify the coding complexity, the transition-based coding scheme of the third embodiment divides each eight-bit code set into left and right four-bit halves. Specifically, this coding scheme effectively classifies each four-bit "half" pattern as part of a respective code group, and identifies certain left and right half code group combinations that may present a prohibited bit pattern if left uncorrected. For the identified left and right half code group combinations that may present a prohibited bit pattern in any set of eight bit data, the coding scheme automatically performs a specified mapping on the input data based on a presumption that it might represent a prohibited pattern.

For example, in a first implementation of the third embodiment, a coding scheme encodes eight bits for transmission over nine wires in a manner to disallow a "111" pattern on any set of three physically neighboring lines over at least a portions of the nine wires during a unit time interval. Thus, in this scheme, of the 256 possible eight-bit combinations, there are 149 unique bit states that do not present an adjacent "111" pattern in the bits, and there are 107 unique bit states that do present a "111" pattern in the bits. In this first implementation of the third embodiment, the nine-bit space includes eight data lines plus an overhead data-bit encoding (DBE) line. In operation, the 149 allowed eight-bit patterns are not encoded by encoder module 106, but instead are passed through to the output of encoder module 106 along with a de-asserted coder_sel bit 440 (as will be explained in more detail below with reference to FIGS. 4E and 4F). The input bits are thus effectively mapped to the eight corresponding LSBs (Least Significant Bits) of the nine-bit space, with the ninth (DBE) bit (the MSB (Most Significant Bit)) being de-asserted. On the other hand, the 107 disallowed patterns that feature a "111" pattern in three physically neighboring bits are mapped to the 149 allowed eight-bit patterns, and passed to the output of encoder module 106 along with an asserted coder_sel bit 440 (as will be explained in more detail below with reference to FIGS. 4E and 4F). In other words, the MSB (the DBE bit) is in this event raised, and used to indicate that mapping has been used to remap a disallowed pattern to a unique, allowable pattern.

In the first implementation of the third embodiment, a scheme to map the 107 disallowed patterns to the 149 allowed 8-bit patterns may be simplified to reduce coding complexity and implemented in silicon. For example, codes may be mapped as groups of code sets (i.e., disallowed code group mapped to an allowed code group) rather than individual codes. For example, the eight-bit data $b_7 b_6 b_5 b_4 b_3 b_2 b_1 b_0$, where $b_7$ is the MSB, can be partitioned into a left-side (four-bit) nibble $[b_0 b_1 b_2 b_3]$, and a right side nibble $[b_4 b_5 b_6 b_7]$. Generally, a nibble refers to four adjacent bits operated on as a unit. For example, a nibble can include the first four bits or the last four bits of an eight-bit unit of information. In another example, a nibble can include any group of four bits. While in some embodiments a nibble may include four bits, other embodiments include nibbles of greater than or less than eight bits. In one contemplated scheme, each left-side nibble $[b_0 b_1 b_2 b_3]$ can be classified as one of eight four-bit categories as follows:

(1) SIL=['1111'; '1110'; '0111']
(2) SF1=['0000'; '1000'; '0100'; '1100']
(3) SF2=['0010'; '1010'; '0110']
(4) SL1=['0001'; '1001'; '0101'; '1101']
(5) SL2=['0011'; '1011']

(6) SL=[SL1; SL2]
(7) SF1*=['0000'; '1000'; '0100']
(8) SL1*=['0001'; '1001'; 0101']

Each right-side nibble [$b_4\ b_5\ b_6\ b_7$] can also be classified as one of eight four-bit categories as follows:
(1) SILM=['111'; '0111'; '1110']
(2) SF1M=['0000'; '0001'; '0010'; '0011']
(3) SF2M=['0100'; '0101'; '0110']
(4) SL1M=['1000'; '1001'; '1010'; '1011']
(5) SL2M=['1100'; '1101']
(6) SLM=[SL1M; SL2M]
(7) SF1*M=['0000'; '0001'; '0010']
(8) SL1*M=['1000'; '1001'; '1010']

Nibble SIL is a collection of four-bit patterns that are disallowed, whether alone or in combination with another four-bit pattern, because each pattern includes the disallowed "111" pattern. Nibbles SF1 and SF2 are collections of four-bit patterns that are allowed because they do not include a "111" pattern, and they do not create a "111" pattern in conjunction with another allowed four-bit pattern. This is because in all codes within SF1 and SF2, the right-most bit feature a zero. Nibble SL1 is a collection of four-bit patterns that are potentially allowable, but could lead to a disallowed eight-bit pattern in combination with a SL2 sequence since their right-most bit is "1." Nibble SL2 is a collection of four-bit patterns that are allowed alone, and disallowed when combined with a mirrored SL1 or SL2 nibble because an SL2 nibble ends in a "11" pattern. Nibble SL is a collection of nibbles SL1 and SL2, and SF1* and SL1* are subsets of SF1 and SL1. All the sets corresponding to the right-side nibble are mirrored versions of the left-side sets.

TABLE 4

(8-bit to 9-bit code set mapping)

| Disallowed code set [$b_0\ b_1\ b_2\ b_3\ b_4\ b_5\ b_6\ b_7$] | Allowed code set [DQ0 DQ1 DQ2 DQ3 DQ4 DQ5 DQ6 DQ7] |
| --- | --- |
| 1 [SIL,SF2M] | [SF1*,SF2M] |
| 2 [SIL,SF1M] | [SF2,SF1M] |
| 3 [SF1,SILM] | [SF1,SF1*M] |
| 4 [SF2,SILM] | [SF2,SF2M] |
| 5 [SIL,SLM] | [SF2,SLM] |
| 6 [SL,SILM] | [SL,SF2M] |
| 7 [SL1,SL2M] | [SL1,SF1*M] |
| 8 [SL2,SL1M] | [SF1*,SL1M] |
| 9 [SL2,SL2M] | [SL2,SF1*M] |
| 10 [SIL,SILM] | [SL1*,SL1*M] |

For example, Table 4 above shows an exemplary eight-bit to nine-bit code set mapping of the first implementation of the alternative transition based coding scheme according to the third embodiment. Based on this partitioning, the collection of the 107 disallowed codes may be represented as ten code sets as shown in the first column of Table 4 above. The second column of Table 4 above shows an exemplary one-to-one mapping of disallowed code sets to allowed code sets (i.e., code sets that do not include a "111" pattern). For example, in the first row, disallowed code set [SIL,SF2M] include the following codes:

[1111, 0100], [1111, 0101], [1111, 0110]
[1110, 0100], [1110, 0101], [1110, 0110]
[0111, 0100], [0111, 0101], [0111, 0110]

According to the mapping shown in Table 4 above, the disallowed code set [SIL,SF2M] can be mapped to [SF1*, SF2M], which includes the following codes:

[0000, 0100], [0000, 0101], [0000, 0110]
[1000, 0100], [1000, 0101], [1000, 0110]
[0100, 0100], [0100, 0101], [0100, 0110]

In applying the coding scheme described in Table 4, right and left hand nibbles are identified, prohibited bit patterns (i.e., "111" patterns) in the identified right and left hand nibbles are also identified, and any identified right and left hand nibble that includes a prohibited bit pattern is mapped to a permitted bit pattern in accordance with the mapping scheme described in Table 4. If a "111" pattern is detected and the mapping in Table 4 is used to encode the eight-bit data, then the DBE bit is set (e.g., "1") to indicate that mapping was performed. However, if no "111" pattern is detected and the data is not encoded and merely passed through and the DBE bit is not set (e.g., "0") to indicate that mapping was not performed. Thus, the eight-bit allowed code set in Table 4 combined with the DBE bit forms a nine-bit code space to which both the allowed and disallowed 8-bit patterns can be mapped. In addition, the mapping in Table 4 is based on groups of code sets rather than individual codes, which reduces the complexity of the logic and circuitry for data bus encoding to avoid "111" data patterns for reducing worst case crosstalk scenarios.

The above mapping in Table 4 is necessarily a valid mapping (i.e., no three adjacent "1s") if the DBE bit is not transmitted on a line physically adjacent to the lines carrying the eight-bit encoded pattern in Table 4. However, if the DBE bit is positioned to be transmitted physically adjacent to the eight-bit encoded pattern in Table 4, a second implementation of the alternative transition based coding scheme of the third embodiment may also account for a transitioning DBE bit routed with the eight-bit encoded data. DBE transitions if coder_sel bit (440) is asserted. This means that a transition of the DBE bit itself can contribute to a worst case crosstalk scenario if the bits on two wires nearest to the wire carrying the DBE bit over a portion of the parallel communication link carrying the nine-bit coded data transition during the same unit interval. This means that the coding Table 4 would have to be modified to account for "coder_sel=1" state in the second implementation of the alternative transition based coding scheme of the third embodiment. For example, for the case when the DBE bit is routed next to the LSB DQ0 of the encoded 8-bit data [DQ0 DQ1 DQ2 DQ3 DQ4 DQ5 DQ6 DQ7], a pattern starting with b0=1 and b1=1 is not allowed because coder_sel bit 440 is placed to the left of b0 and is equal to 1. For example, as shown in the third row of Table 5, three codes of code set [SF1,SF1*] become illegal if DBE is routed next to DQ0 and is asserted. In particular, for SF1, code 1100 ($b_0\ b_1\ b_2\ b_3$) becomes 11100 (coder_sel $b_0\ b_1\ b_2\ b_3$).

TABLE 5

(Alternative 8-bit to 9-bit code set mapping)

| Disallowed code set | Allowed code set | If DBE routed next to DQ0 |
| --- | --- | --- |
| 1 [SIL,SF2] | [SF1*,SF2] | |
| 2 [SIL,SF1] | [SF2,SF1] | |
| 3 [SF1,SIL] | [SF1,SF1*] | 3 disallowed codes |
| 4 [SF2,SIL] | [SF2,SF2] | |
| 5 [SIL,SL] | [SF2,SL] | |
| 6 [SL,SIL] | [SL,SF2] | 3 disallowed codes |
| 7 [SL1,SL2] | [SL1,SF1*] | 2 disallowed codes |
| | | 3 unmapped allowed codes |
| 8 [SL2,SL1] | [SF1*,SL1] | 4 unmapped allowed codes |
| 9 [SL2,SL2] | [SL2,SF1*] | 2 unmapped allowed codes |
| 10 [SIL,SIL] | [SL1*,SL1*] | |

Using this mapping scheme, eight of the otherwise allowed codes under the first implementation of the third embodiment may be disallowed under this second implementation of the third embodiment if DBE is routed next to DQ0, as shown in rows 3, 6, and 7 of Table 5. The mapping scheme shown in Table 5 also includes nine unmapped allowed codes, as shown in rows 7, 8, and 9. In an example mapping scheme, the eight disallowed codes may be directly mapped to one of the nine unmapped allowed codes, or remapped to one of the nine unmapped codes. In operation, the mapping of the disallowed code sets to allowed code sets may occur in parallel, sequentially, or in another manner based on the system environment.

Figure 4A:
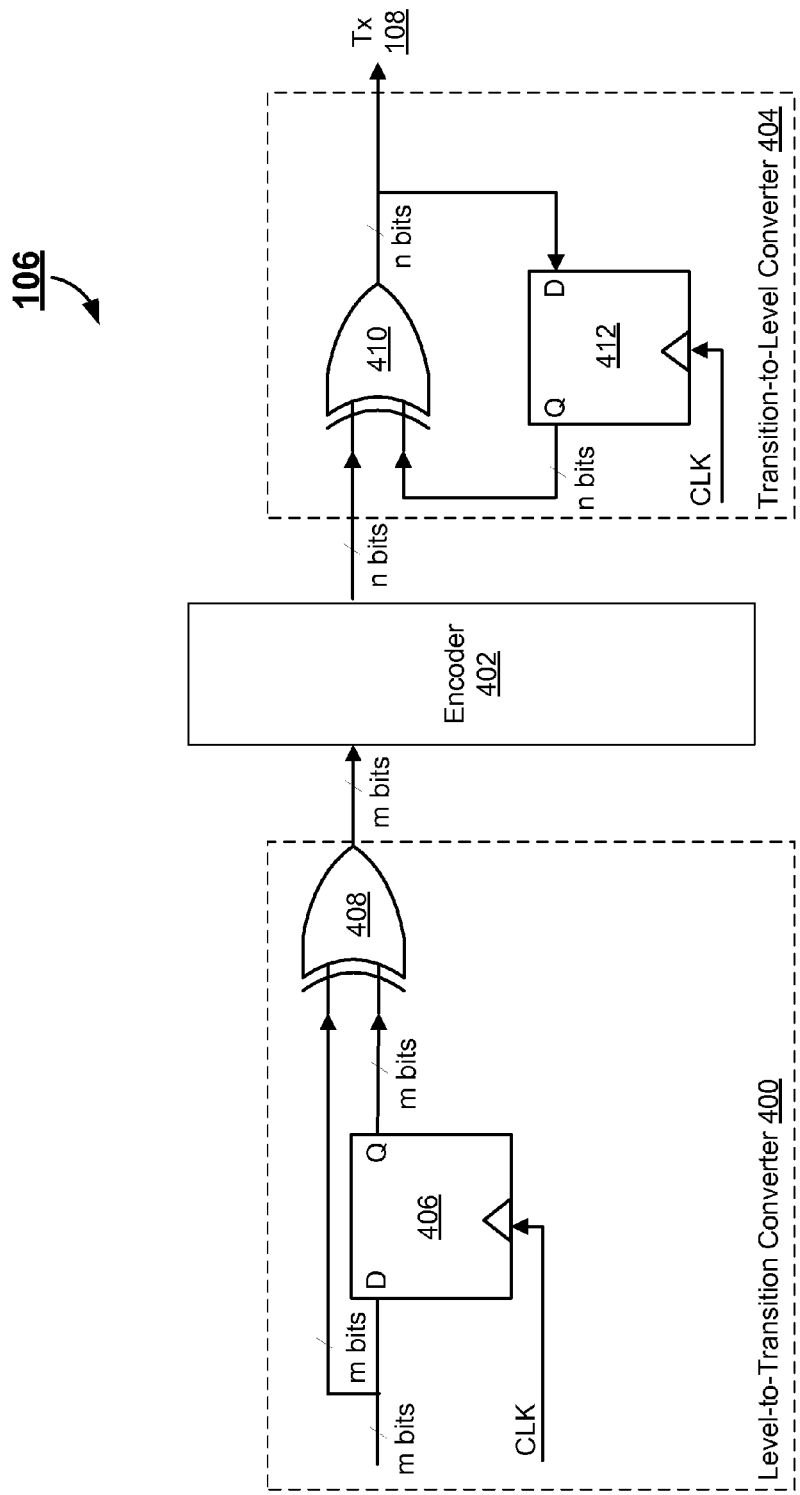
FIG. 4A illustrates example circuitry of the transition-based coding scheme logic in the encoder module of FIG. 1, according to the second embodiment.

FIG. 4A illustrates example circuitry that uses the transition based coding method illustrated in FIG. 3A according to the second embodiment. This encoder module 106 includes level-to-transition converter 400, encoder 402, and transition-to-level converter 404. Level-to-transition converter 400 receives signal level m-bit data and converts the received data to m-bit transition data to provide to encoder 402.

As shown in FIG. 4A, level-to-transition converter 400 includes flip-flop 406 having a data input D for receiving m-bit data, and a control input for receiving control signal CLK to output stored m-bit data received at data input D to data output Q. Flip-flop 406 operates as a register to store a first set of m-bit data received at a first time. The data output Q of flip-flop 406 provides the stored first set of m-bit data to a first input of exclusive-or gate 408 responsive to the rising or falling edge of control signal CLK. The second input of exclusive-or gate 408 is coupled to the data input D of flip-flop 406 to receive a present (second) set of m-bit data.

In operation, exclusive-or gate 408 compares the stored first set of m-bit data and the second set of input data. If the value of the first set of m-bit data and the value of the second set of input data are different, exclusive-or gate 408 outputs a logic high ("1") to indicate a transition of the data between the first and second sets of input data. On the other hand, if the value of the first set of m-bit data and the value of the second set of m-bit data are the same, exclusive-or gate 408 outputs a logic low ("0") to indicate the absence of a transition.

Encoder 402 may include any combination of logic elements and/or hardware controlled by instructional logic configured to receive the m-bit data, and conduct transition-based encoding according to mapping schemes described in FIGS. 3A and 3C. Specifically, encoder 402 encodes m-bit data from level-to-transition converter 400 to generate n-bit data output such that no three neighboring bits in the encoder output are logic high during any interval.

Transition-to-level converter 404 receives the encoded n-bit data from encoder 402 and converts the n-bit transition data to signal level data. As the n-bit output of encoder 402 is generated such that no three neighboring bits in the encoder output are logic high during any interval, the output of transition-to-level converter 404 therefore has no three neighboring bits corresponding to three physically neighboring lines over at least a portion of n-bit parallel communication link 114 that all transition in two consecutive symbol intervals. Transition-to-level converter 404 may include similar components (e.g., exclusive-or gate 410 and flip-flop 412) as level-to-transition converter 400, but organized in a different manner to perform the reverse operation of level-to-transition converter 400 and thereby converting the n-bit data from the encoder 402 encoded as transition data to signal level data. The output of transition-to-level converter 404 is coupled to the input of transmitter 108 to transmit the encoded first and second sets of n-bit data over parallel communication link 114.

Figure 4B:
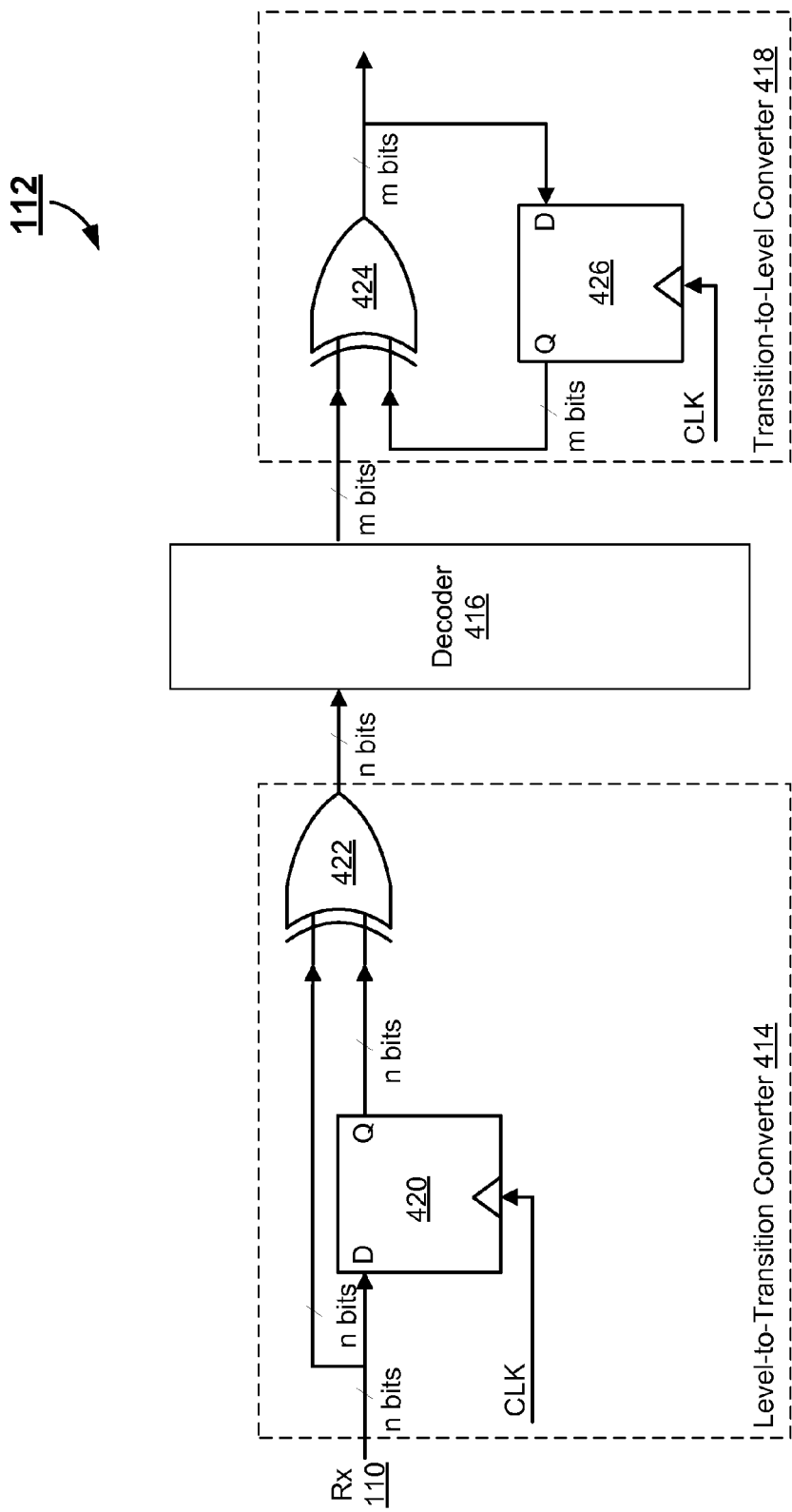
FIG. 4B illustrates example circuitry of the transition-based decoding scheme logic in the decoder module of FIG. 1, according to the second embodiment.

FIG. 4B illustrates example circuitry of the transition-based decoding scheme logic in decoder module 112 of FIG. 1 using the transition-based decoding method illustrated in FIG. 3B according to the second embodiment. In an embodiment, decoder module 112 includes level-to-transition converter 414, decoder 416, and transition-to-level converter 418. Level-to-transition converter 414 receives from receiver 110 encoded n-bit signal level data and converts the received data to n-bit transition data to provide to decoder 416.

As shown in FIG. 4B, level-to-transition converter 414 includes flip-flop 420 having a data input D for receiving n-bit signal level data, and a control input for receiving control signal CLK to output stored n-bit data received at data input D to data output Q. Flip-flop 420 operates as a register to store a first set of n-bit data received at a first time. The data output Q of flip-flop 420 provides the stored first set of n-bit data to a first input of exclusive-or gate 422 responsive to the rising or falling edge of control signal CLK. The second input of exclusive-or gate 422 is coupled to the data input D of flip-flop 420 to receive a present (second) set of n-bit data.

As previously described with reference to exclusive-gate 408 included in level-to-transition converter 400 in FIG. 4A, exclusive-or gate 422 compares the value of the first set of n-bit data and the value of the second set of n-bit data. If the value of the first set of n-bit data and the value of the second set of n-bit data are different, exclusive-or gate 422 outputs a logic high ("1") to indicate a transition. On the other hand, if the value of the first set of n-bit data and the value of the second set n-bit data are the same, exclusive-or gate 422 outputs a logic low ("0") to indicate the absence of a transition.

Decoder 416 may be any combination of logic elements and/or code configured to receive the n-bit transition data, and conduct transition-based decoding according to the second embodiment as described above with reference to FIGS. 3B and 3C. Transition-to-level converter 418 receives the decoded m-bit transition data from decoder 416 and converts the transition data to m-bit signal level data. Transition-to-level converter 418 may include similar components (e.g., exclusive-or gate 424 and flip-flop 426) as transition-to-level converter 404 in FIG. 4A, and operates in substantially the same manner.

Figure 4C:
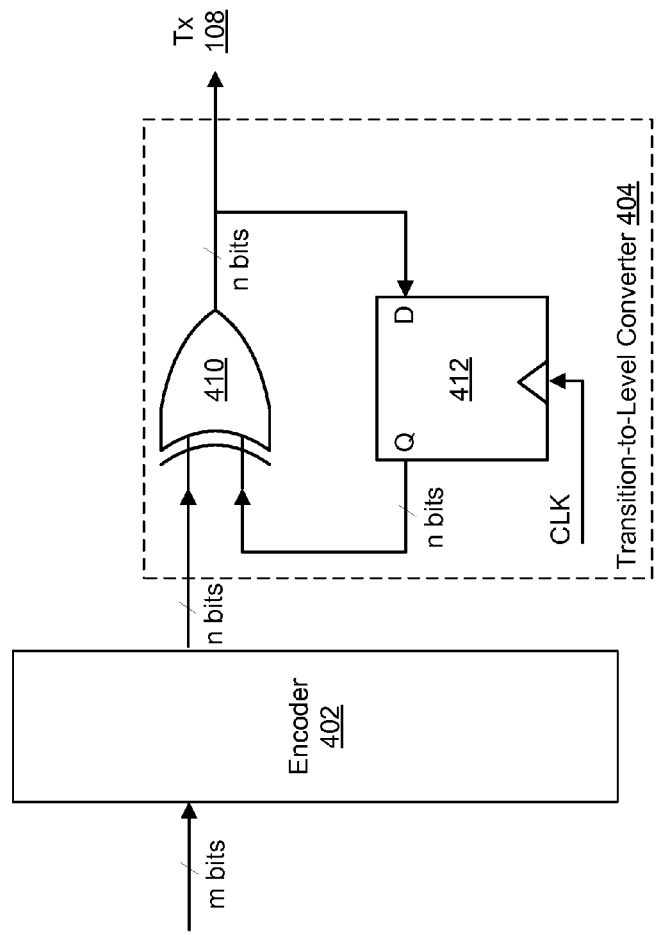
FIG. 4C illustrates another example circuitry of the transition-based coding scheme logic in the encoder module of FIG. 1, according to the second embodiment.

FIG. 4C illustrates another example circuitry of the encoder module for use with the transition-based coding scheme according to the second embodiment. Encoder module 106 encodes the m-bit data as a combination of signal transitions to generate n-bit data as a combination of signal level patterns, without the use of level-to transition converter 400 as described with reference to FIG. 4A. Encoder module 106 includes encoder 402 having an output coupled to transition-to-level converter 404. Encoder 402 receives the m-bit data as a combination of signal transitions, and conducts transition-based encoding according to a mapping scheme according to the second embodiment as described in FIG. 3C. In particular, encoder 402 encodes the m-bit data to n-bit data disallowing a "111" pattern on any three neighboring lines.

To generate n-bit signal level data from m-bit transition data in accordance with the described coding scheme according to the second embodiment, encoder 402 maps a logic low ("0") level signal to indicate a non-transition signal, and maps a logic high ("1") level signal to indicate a transition signal. For example, in accordance with the exemplary mapping scheme described in Table 318 of FIG. 3C, encoder 402 maps the allowed three-bit pattern "000" representing a combination of signal levels on three adjacent bits to allow four-bit pattern "0000" representing a combination of signal transitions, and maps disallowed three-bit pattern "111" to allowed four-bit pattern "1000." Transition-to-level converter 404 receives the encoded n-bit data representing a combination of signal transitions from encoder 410 and converts the combination of signal transitions to n-bit data representing a combination of signal levels as previously described with reference to FIG. 4A. In other words, encoder module 106 performs transition-based encoding by treating signal levels corresponding to unencoded m-bit data as if they were transitions. It can be shown that the logic circuit of FIGS. 4A and 4C perform encoding and decoding functions equivalent to those of FIGS. 4B and 4D, respectively. Since input data is a bit-stream, it does not matter whether the input data is assumed to convey transition information or level-information, as long as the same bit stream is recovered at the receiver side. In the circuits of FIGS. 4A and 4B, the input data is assumed to be in data levels, then transferred to transition signals for encoding, and then transferred back to level signals, which is somewhat redundant. The circuits of FIGS. 4C and 4D remove the redundancy by treating the input data as if they represent signal transitions.

Figure 4D:
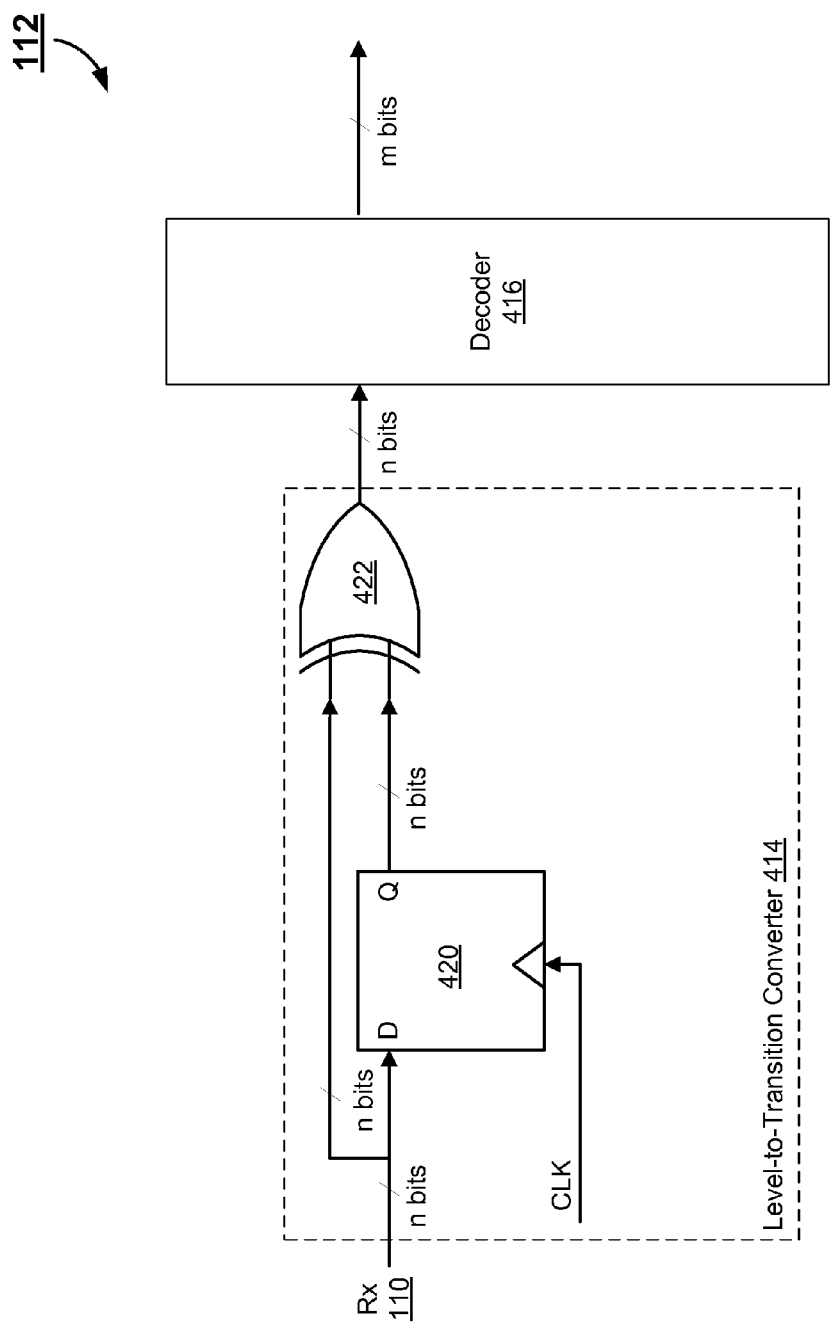
FIG. 4D illustrates another example circuitry of the transition-based decoding scheme logic in the decoder module of FIG. 1, according to the second embodiment.

FIG. 4D illustrates example circuitry of the transition-based decoding scheme logic in decoder module 112 using the decoding method illustrated in FIG. 3B according to the second embodiment, which should be used in conjunction with the encoder of FIG. 4C. Referring to FIG. 4D, at receiver 110, decoder module 112 performs the reverse operation of encoder module 106 of FIG. 4C. In particular, decoder module 112 decodes n-bit data patterns representing a combination of signal transitions, provided by level-to-transition converter 414, to generate m-bit data representing a combination of signal transitions.

Decoder module 112 includes level-to-transition converter 414 and decoder 416. Level-to-transition converter 414 receives from receiver 110 n-bit representing a combination of signal levels and converts the received data to n-bit data representing a combination of signal transitions to provide to decoder 416. Decoder 416 receives encoded n-bit data representing a combination of signal transitions, and conducts transition-based decoding according to mapping schemes as described in FIG. 3C according to the second embodiment. In operation, decoder 416 is comprised of combinational logic that reverses the operation performed by encoder 402.

Figure 4E:
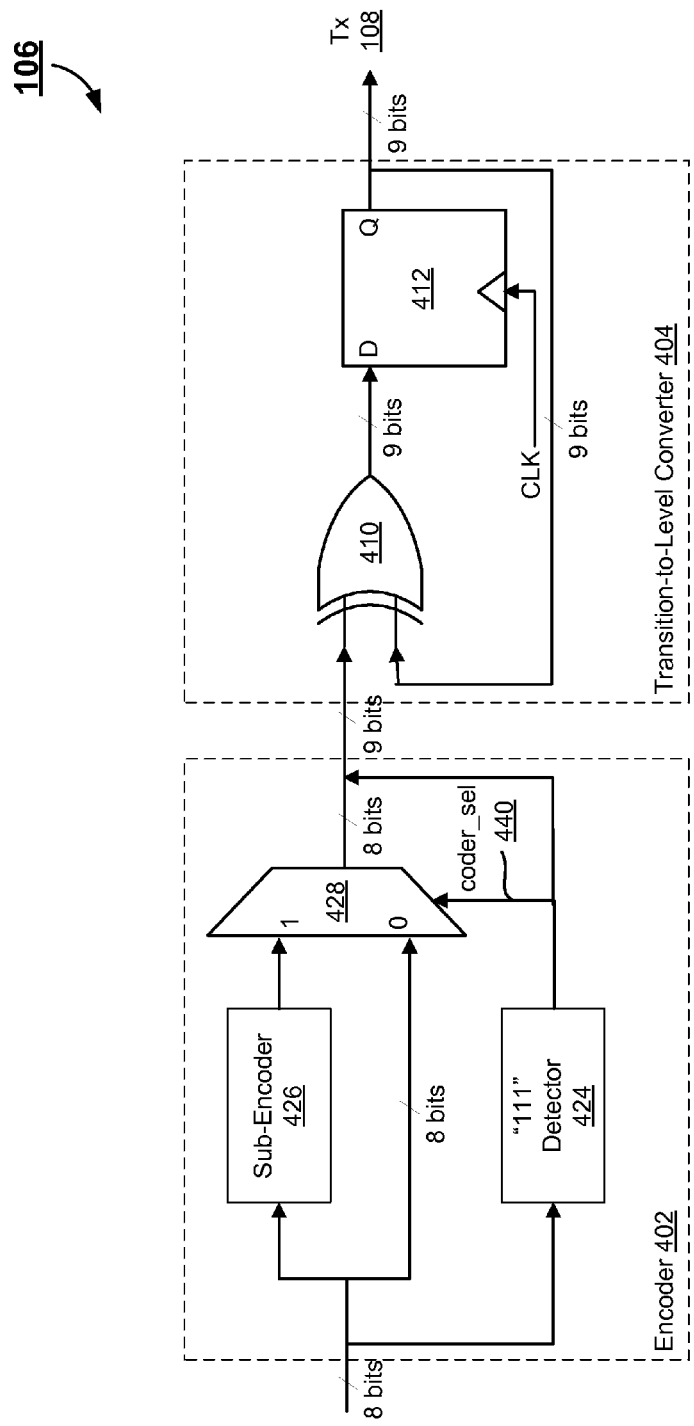
FIG. 4E illustrates an example circuitry of the transition-based coding scheme logic in the encoder module of FIG. 1, according to a third embodiment.

FIG. 4E illustrates example circuitry for use with the alternative transition-based coding scheme as described above in reference to Tables 4 and 5 according to the third embodiment. When a disallowed pattern "111" is detected in the input eight-bit data, encoder module 106 encodes eight-bit data to another set of eight-bit data using transition-based encoding and also creates a transition on the data-bit encoding (DBE) line (or equivalently, asserted the coder_sel bit 440). As a result, the encoded data output by encoder is nine bits (including the DBE bit). And, when a disallowed pattern "111" is not detected in the input eight-bit data, encoder module 106 passes the eight-bit data through as the original eight-bit data value along with a non-transitioning DBE bit.

More specifically, encoder module 106 includes detector 424, sub-encoder 426, and multiplexer 428. Detector 424 receives the eight-bit unencoded data $b_0$-$b_7$ and asserts a coder_sel bit 440 when it detects that any three neighboring bits of the eight-bits include a disallowed "111" pattern indicating all three neighboring bits transitioning during a unit interval. Detector 424 may include combination logic and/or code suitable to detect and identify a signal level from a multi-bit transmission line. Multiplexer 428 has a first data input for receiving the output of sub-encoder 426, a second data input for receiving the eight-bit unencoded data, and a control input for receiving a coder_sel bit 440 from the output of detector 424. Sub-encoder 426 treats the signal levels as transition and encodes the eight-bit unencoded data in accordance with mapping schemes described in reference to Tables 4 and 5 above according to the third embodiment, and provides encoded eight-bit data to the first data input of multiplexer 428.

In operation, when detector 424 detects a "111" pattern in the eight-bit unencoded data during a unit interval, detector 424 asserts coder_sel bit 440, to cause multiplexer 428 to select the output of sub-encoder 426. On the other hand, when detector 424 does not detect a "111" pattern in the eight-bit unencoded data during a unit interval, detector 424 de-asserts coder_sel bit 440, to cause multiplexer 428 to select the eight-bit unencoded data.

Transition-to-level converter 404 receives the eight-bit data and coder_sel bit 440 and converts the eight-bit data from transitions to signal levels (DQ0-DQ7), and the coder_sel bit 440 to DBE. The converted nine-bit signal level data (DQ0-DQ7+DBE) is then provided to transmitter 108 for transmission to circuit 104 over parallel communication link 114.

Figure 4F:
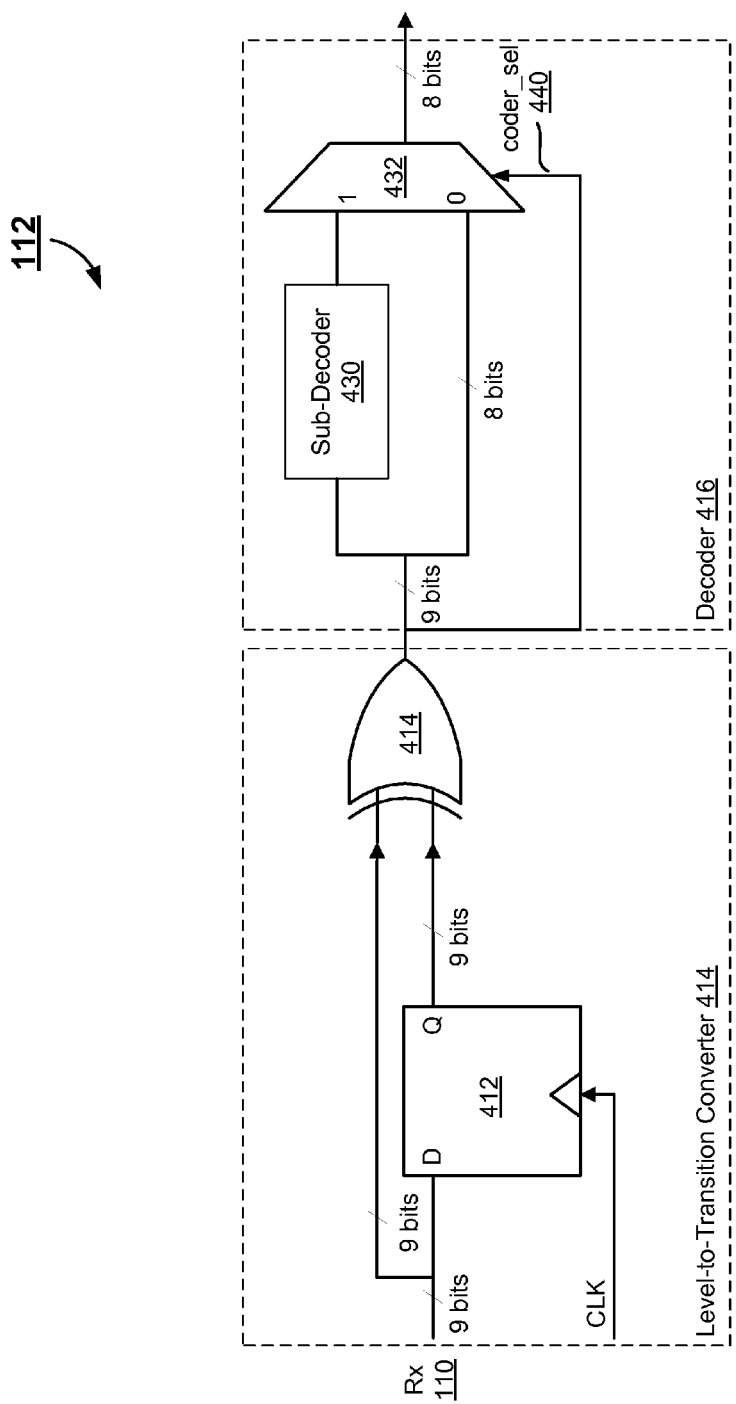
FIG. 4F illustrates an example circuitry of the transition-based decoding scheme logic in the decoder module of FIG. 1, according to the third embodiment.

FIG. 4F illustrates example circuitry for use with the alternative transition-based decoding scheme as described above in reference to Tables 4 and 5 according to the third embodiment. Decoder module 112 operates in reverse order of encoder module 106 to recover the eight-bit unencoded data received by encoder 402.

Decoder module 112 includes level-to-transition converter 414 and decoder 416. Level-to-transition converter 414 receives nine-bit encoded signal level data (DQ0-DQ7+DBE) from receiver 110, and provides transition data (nine-bit transition encoded data) to decoder 416 for decoding. Decoder 416 includes sub-decoder 430 and multiplexer 432. Sub-decoder 430 may include any combination of logic elements and/or code configured to receive the transition encoded eight-bit data and provides eight-bit unencoded data ($b_0$-$b_7$) to multiplexer 432. Multiplexer 432 has a first data input for receiving the decoded data provided by sub-decoder 430, a second data input for receiving the output of level-to-transition converter 414 without the DBE bit. Multiplexer 432 also has a control input for receiving coder_sel bit 440 (DBE after transition encoding) from the output of level-to-transition converter 414 to select either the output of sub-decoder 430 or eight-bit unencoded data passed through encoder 402.

FIG. 5 illustrates another system 500 including an encoder module 106 and a decoder module 112 using one or a combination of level-based and transition-based encoding and decoding according to a fourth embodiment. System 500 includes memory controller integrated circuit (IC) 502 and memory module 508 configured to communicate with each other using parallel communication link 114. Memory controller 502 may be a chip that is capable of controlling one or more memory devices (not shown) included in memory module 508. Examples of a memory controller 502 include a central processing unit (CPU), a graphics processing unit (GPU), a system on chip (SoC), etc. Memory controller 502 controls the operation of memory module 508 by transmitting command and address information and read/write data using parallel communication link 114.

Memory module 508 includes one or more memory devices. Consistent with its ordinary and customary meaning, a memory device is an integrated circuit device (i.e. a chip) in which information can be stored and retrieved electronically. Additionally, a memory device may represent any type of memory, such as dynamic random access memory (DRAM), static random access memory (SRAM), or non-volatile memory (NVM).

Memory controller 502 includes encoder module 106 and transmitter (Tx) 108. Unencoded m-bit data is provided to encoder module 106 as serial or parallel data to generate encoded n-bit data. Transmitter 108 receives the encoded n-bit data from encoder module 106 for transmission across parallel communication link 114.

Memory module 508 includes decoder module 112 and receiver (Rx) 110. Receiver 110 is coupled to receive the encoded n-bit data from parallel communication link 114 for decoding by decoder module 112. The encoded n-bit data is provided to decoder module 112 as serial or parallel data from receiver 110. In an embodiment, memory module 508 also includes another encoder module (not shown) and a transmitter (not shown) for transmitting encoded data to memory controller 502, and memory controller 502 includes a receiver (not shown) and a decoder module (not shown) for receiving and decoding the encoded data received from memory module 508.

As previously described in reference to FIG. 1, encoder module 106 operates to map an m-bit pattern to an n-bit pattern that does not include a prohibited data pattern. In an embodiment, encoder module 106 may include level-based encoder 504 and transition-based encoder 402 for performing one or a combination of level-based and transition-based encoding modes according to the first, second, and third embodiments described herein. Encoder module 106 may be further coupled to register 506 that stores a control flag to enable, disable, or select an encoding mode such as level-based encoding, transition-based encoding, or both.

Transmitter 108 transmits the n-bit data received from encoder module 106 over parallel communication link 114 to receiver 110 of memory module 508. Receiver 110 provides the received n-bit data to decoder module 112. Decoder module 112 decodes the n-bit data to recover the unencoded m-bit data. In an embodiment, decoder module 112 includes level-based decoder 510 and transition-based decoder 416 for performing one or a combination of level-based and transition-based decoding according to the first, second, and third embodiments described herein. Decoder module 112 may be further coupled to register 512 to enable, disable, or select a decoding mode such as level-based decoding, transition-based decoding, or both.

Upon reading this disclosure, those of ordinary skill in the art will appreciate still alternative structural and functional designs for level-based and/or transition-based encoding of multi-bit data to avoid worst case crosstalk scenarios, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the spirit and scope of the disclosure as defined in the appended claims.

What is claimed is:

1. A first circuit to transmit data to a second circuit over a parallel binary communication link having at least n parallel lines, where n is an integer not less than four, the first circuit comprising:
   an encoder to receive and encode m-bit data to generate n-bit data for transmission over the parallel binary communication link, wherein
      m is an integer not less than three and less than n, and the encoder generates the n-bit data from the m-bit data where no set of three physically neighboring lines of the n parallel lines are permitted to simultaneously carry a predetermined disallowed three-bit value, the predetermined disallowed three-bit value comprises a three-bit value representing a signal level transition in each of the three physically neighboring lines relative to an immediately previous three-bit value in each of the three physically neighboring lines; and
   a transmitter to transmit the encoded n-bit data over the parallel communication link.

2. The first circuit of claim 1, wherein n is not less than five and m is less than n.

3. A circuit comprising:
   an encoder operable to
      receive and encode at a first time a first set of m-bit data and generate a first set of n-bit data, m being an integer not less than three, and n being an integer not less than four and greater than m, and
      receive and encode at a second time a second set of m-bit data and generate a second set of n-bit data; and
   a transmitter operable to transmit signals respectively representing the encoded first and second sets of n-bit data over an n-bit parallel binary communication link;
   wherein a transition in signal level between the respective signals on each of three physically neighboring lines of the n-bit parallel binary communication link is not permitted.

4. The circuit of claim 3, wherein the encoder is operable to generate the first and second sets of n-bit data as outputs such that no predetermined subset of three bits of the respective n-bit outputs are permitted to have the same logic state, and wherein the circuit further comprises a converter coupled to the encoder and operative to process the outputs such that no set of three physically neighboring lines of the n-bit parallel binary communication link are permitted to simultaneously transition.

5. The circuit of claim 3, wherein m is eight and n is nine.

6. The circuit of claim 3, wherein the encoder is enabled to encode the m-bit data responsive to detecting a predetermined pattern in three neighboring bits of the m-bit data.

7. The circuit of claim 3, wherein the encoder includes logic to partition the m-bit data into a first group and a second group of adjacent bits and, if the first group of adjacent bits include a disallowed data pattern, to map the first group of adjacent bits to a third group of adjacent bits that do not include the disallowed data pattern and to substitute the third group of adjacent bits in place of the first group of adjacent bits, the third group and the second group of adjacent bits thereby being grouped to generate the n-bit encoded data.

8. The circuit of claim 7, wherein if the second group of adjacent bits also include a disallowed data pattern, the encoder further includes logic to map the second group of adjacent bits to a fourth group of adjacent bits that do not include the disallowed data pattern, and to substitute the fourth group of adjacent bits in place of the second group of adjacent bits, the third group and the fourth group of adjacent bits thereby being grouped to generate the n-bit encoded data.

9. The circuit of claim 3, wherein the circuit is embodied as an integrated circuit.

* * * * *